United States Patent [19]

Siva

[11] Patent Number: 5,007,300
[45] Date of Patent: Apr. 16, 1991

[54] MULTI-AXIS HAND CONTROLLER

[75] Inventor: Kumar V. Siva, Lightwater, United Kingdom

[73] Assignee: United Kingdom Atomic Energy Authority, London, England

[21] Appl. No.: 468,249

[22] Filed: Jan. 22, 1990

[30] Foreign Application Priority Data

Mar. 3, 1989 [GB] United Kingdom ............... 8904955

[51] Int. Cl.$^5$ ............................. G05G 9/00; B25J 3/00
[52] U.S. Cl. ................................. 74/471 XY; 74/525; 414/5
[58] Field of Search .......................... 74/471 XY, 525; 244/236, 237; 414/2, 5; 273/148 B; 338/128; 200/6 A

[56] References Cited

U.S. PATENT DOCUMENTS

| 3,215,391 | 11/1965 | Storm | 74/471 XY X |
| 3,409,252 | 11/1968 | Miller | 338/128 X |
| 4,604,016 | 8/1986 | Joyce | 74/471 XY X |
| 4,726,248 | 2/1988 | Kawai et al. | 74/471 XY |
| 4,914,976 | 4/1990 | Wyllie | 244/237 |

Primary Examiner—Allan D. Herrmann
Assistant Examiner—Julie Krolikowski
Attorney, Agent, or Firm—William R. Hinds

[57] ABSTRACT

A hand controller (10) is provided with which an operator can simultaneously control several degrees of freedom of a mechanism, for example a slave arm (18), single handedly. An operator's handle (12) is connected by four links serially arranged between the handle and elements (50, 48, 46, 42) to a platform (32), these links permitting rotation about three axes (A, B, C) and linear displacement towards and away from the platform (axis Z). The platform is connected by three parallel non-telescopic legs (34) to a base (30) so that the platform (32) (and so the handle 12) can be moved in directions (X and Y) perpendicular to the Z axis. Force and torque feedback may be provided to all motions of the hand controller (10).

2 Claims, 1 Drawing Sheet

MULTI-AXIS HAND CONTROLLER

The invention relates to a hand controller with which an operator can control movements of a mechanism such as a manipulator slave arm, a crane, an excavator or a vehicle, the controller providing for control of several degrees of freedom of the mechanism.

For dexterous control of a remote mechanism the controller is desirably convenient to use, and desirably reflects the forces applied by the mechanism, though in such a way as to minimize operator fatigue. Convenience in use relates to the size of the displacements which the operator must impose on the controller (smaller displacements generally being more convenient), and to the spatial correspondence between displacements applied to the controller and the corresponding displacement undergone by the mechanism.

A variety of multi-axis hand controllers are known. For example, U.S. Pat. No. 4,604,016 (Joyce) describes a hand controller capable of six degrees of freedom, in which a handle is supported by twelve tension wires extending to vertices of a tetrahedron. In contrast, U.S. Pat. No. 4,914,976 (Wyllie) describes a five or six degree of freedom hand control which includes a two or three degree of freedom wrist motion handle mounted on a forearm mounting member; the member is pivotally connected to a bracket to allow for rotation about a horizontal axis; the bracket is pivotally connected to a third member to allow for rotation about a vertical axis; and the third member is connected to a rigid base so as to allow linear displacement along an axis. In this type of linkage, where a plurality of components A, B, C, D ... are linked in series (A linked to B, B linked to C, C linked to D, etc.), each link providing a separate degree of freedom, the links may be described as serially arranged. Similarly, U.S. Pat. No. 4,726,248 (Kawai et al) describes a three degree of freedom hand controller incorporating three serially arranged links which respectively allow rotation of a grip about orthogonal intersecting axes X, Y and Z.

According to the present invention there is provided a hand controller whereby an operator can control movements of a mechanism, the hand controller comprising a base, a support frame connected to the base by three parallel non-telescopic link arms with universal joints at each end so as to allow displacements of the frame relative to the base, and an operating handle connected by four serially arranged links to the support frame, the said links respectively allowing rotation of the handle about three independent axes and linear displacement of the handle relative to the support frame.

The hand controller thus provides six degrees of freedom: rotation about the three independent axes (two of which are preferably mutually perpendicular), and linear displacements parallel to three axes which are preferably mutually perpendicular. It can thus be used to control a remote mechanism with several degrees of freedom which need to be co-ordinated. If additional degrees of freedom need to be provided to the hand controller, the handle may incorporate switches or other input devices which the operator can operate with his fingers or thumb while holding the handle.

Preferably means are incorporated in the hand controller to provide force feedback in relation to each degree of freedom of the handle. The fed-back forces and torques may be directly proportional to the forces exerted by corresponding joints of the mechanism being controlled, though to minimize operator fatigue some forces exerted by the mechanism, such as those due to the weight of an object being manipulated, or due to frictional effects in the joints, may be partially or completely filtered out.

Sensors in the hand controller provide electrical signals representing the forces or torques and the linear or angular displacements applied by the operator in each linear or rotary degree of freedom. These signals are desirably supplied to a computer, which provides corresponding control signals to motors in the mechanism being controlled. Different control modes may be selected during performance of a task by an operator, for example: position control, rate control, or force control (displacement of the handle causing, respectively, a corresponding displacement of, rate of movement of, or force exerted by, the mechanism); and for each such mode of control the constants of proportionality might also be varied. For example for large-scale motions of the mechanism rate control might be used, to move the mechanism to where a task is to be performed, and then for fine-scale movements of the mechanism during performance of the task, position control with a 1:1 ratio might be preferred.

An embodiment of the invention will now be further described by way of example only, and with reference to the accompanying drawings in which.

Figure 1:
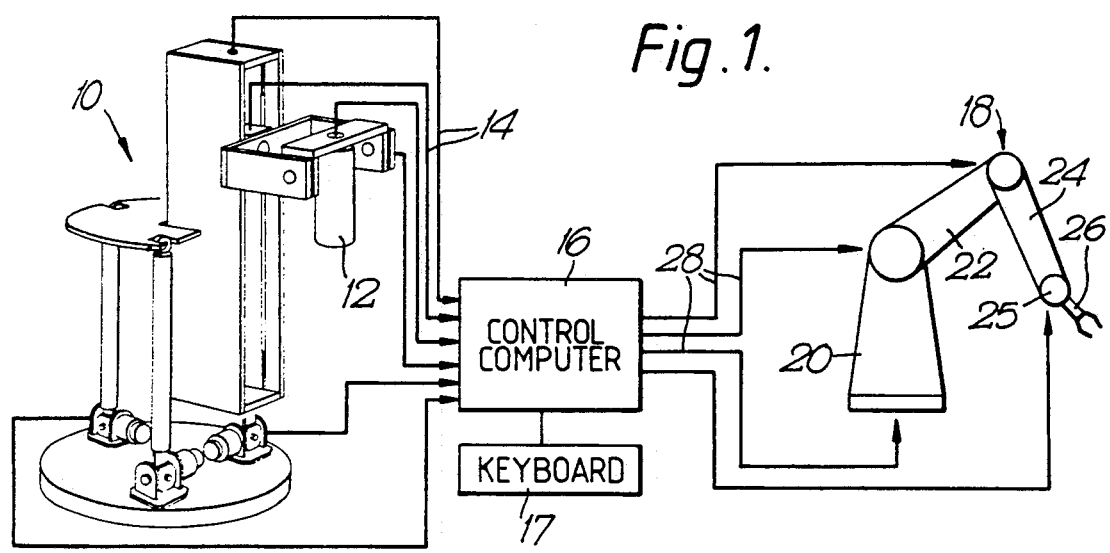
FIG. 1 shows a hand controller connected to a slave arm, the hand controller being shown in perspective and the slave arm being shown diagrammatically.

Referring firstly to FIG. 1, a hand controller 10 is shown with a handle 12. As described in more detail later, an operator can single handedly rotate the handle 12 about three axes, two of which are mutually perpendicular, and can displace the handle 12 parallel to three mutually perpendicular directions. The hand controller 10 incorporates sensors (not shown) which provide electrical signals representing these three rotations and these three linear displacements, the signals being transmitted by leads 14 to a control computer 16 with a keyboard 17. The hand controller 10 can be used to control a wide variety of different mechanisms; in this case it is shown as controlling operation of a slave arm 18. The arm 18 consists of a base 20 which can rotate about a vertical axis, an upper arm 22 pivotally connected to the base 20, a lower arm 24 pivotally connected to the upper arm 22, and a gripper mechanism or tool 26 pivotally connected by a wrist joint 25 to the lower arm 24, the tool 26 also being rotatable about its own longitudinal axis, and being turnable about an axis in the plane of the Figure. The slave arm 18 thus provides six degrees of freedom as regards movement of the gripper or tool 26, and the computer 16 provides appropriate control signals via leads 28 to electric motors (not shown) which are arranged to bring about these six motions, in accordance with the movement of the handle 12.

Figure 2:
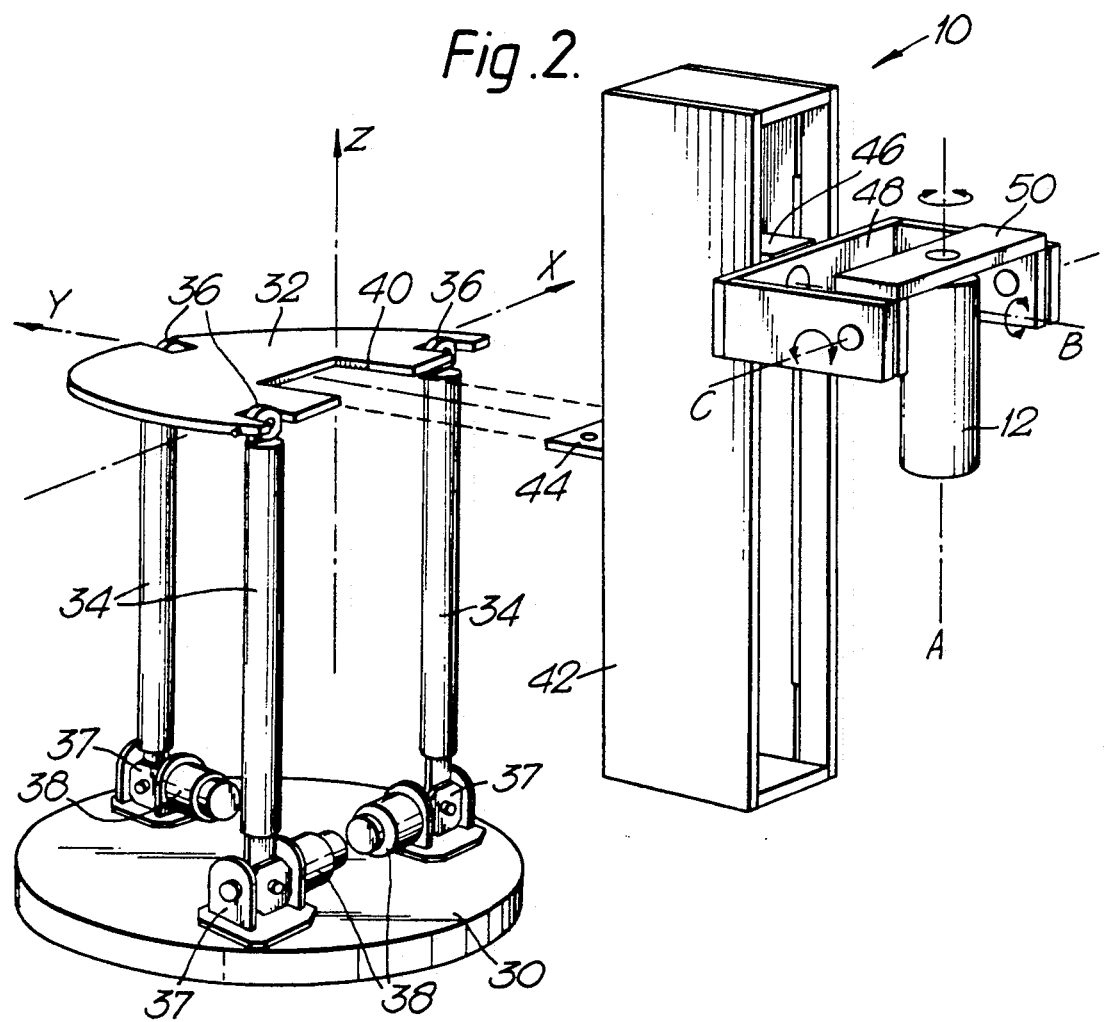
FIG. 2 shows a perspective view to a larger scale of the hand controller of FIG. 1 exploded into two parts for clarity.

Referring to FIG. 2 the hand controller 10 has a base 30 to which is connected an approximately semicircular plate or platform 32 by three parallel fixed-length legs 34. At each end of each leg 34 is a universal joint 36, 37 comprising two pivotal axles at right angles, one axle being oriented parallel to and the other perpendicular to the straight edge of the semicircle in each case. Each of the universal joints 37, which link the legs 34 to the base 30, includes a rotation sensor (not shown) to provide a signal to the control computer 16 (see FIG. 1), and includes an electric motor 38 to apply a torque to the leg 34 and so enable forces to be fed back to the hand controller 10. By virtue of the universal joints 36, 37 the platform 32 and so the handle 12 can be displaced parallel to the straight edge of the semicircle (axis X) or perpendicular to that edge (axis Y) or indeed parallel to any direction in the X-Y plane i.e. the plane of the platform 32. Two of the joints 37 are arranged with the axes of the motors 38 parallel to the X-axis (so providing feed-back forces in the Y direction), and the other joint 37 is arranged with the axis of the motor 38 parallel to the Y-axis (so providing a feed-back force in the X-direction).

In the middle of the straight edge of the plate or platform 32 is a square cut-out 40 which locates a rectangular frame 42, which extends perpendicular to the plane of the platform 32 and is rigidly fixed to it by means of a bracket 44 (the frame 42 and the platform 32 being shown dis-assembled). A support block 46 is slidable along the length of the frame 42, hence providing for movement of the handle 12 perpendicular to the platform 32, parallel to axis Z. A U-shaped yoke 48 is rotatably connected to the support block 46, a second yoke 50 is rotatably mounted between the side portions of the yoke 48, and the handle 12 is rotatably connected to the middle of the second yoke 50. Hence the handle 12 is rotatable about its own axis A, and about two mutually perpendicular axes B and C. It is apparent that the links between the handle 12 and the yoke 50, between the yoke 50 and the yoke 48, between the yoke 48 and the support block 46, and between the block 46 and the frame 42 are serially arranged, and provide four degrees of freedom for the handle 12: three rotational axes A, B, C and one linear displacement axis Z. Sensors (not shown) provide signals to the control computer 16 (see FIG. 1) representing these three rotations (about axes A, B and C) and the linear displacement parallel to the Z-axis. In addition electric motors (not shown) are arranged to enable feedback torques to be applied about each axis A, B and C, and to apply a feedback force to oppose the Z-axis displacement.

It will be appreciated that in the apparatus of FIG. 1, in addition to the control signal leads 14 and 28 which are shown, there are also feedback signal leads (not shown) which provide signals to the computer 16 representing forces or torques exerted by the slave arm 18, and feedback control leads which provide control signals to the electric motors 38 on the base 30 and to the several electric motors (not shown) carried by the frame 42. During operation of the hand controller 10 the operator, by means of the keyboard 17, can program the computer 16 so the feedback forces are changed; for example the weight of an object being carried by the arm 18 might be filtered out, some or all of the forces (and torques) exerted by the arm 18 might not be reflected, or the ratios between forces exerted by the arm 18 and those reflected to the hand controller 10 might be altered. It will also be understood that by use of the keyboard 17 the operator can also modify or change the mode in which the movements of the handle 12 cause movements of the slave arm 18, selecting position control, force control, or rate control for example as discussed earlier, or adjusting the sensitivity with which the slave arm 18 responds.

Where further degrees of freedom of a mechanism are to be controlled, the hand controller 10 may incorporate additional input devices. For example if the hand controller 10 is also to control operation of the gripper or tool 26 at the end of the slave arm 18, this may be done by signals from a trigger, a switch, a thumb-joystick, or a slide toggle (not shown) mounted on the handle 12 so it is convenient for the operator.

It will be understood that the controller may differ considerably in shape and in detailed mechanism while remaining within the scope of the invention. For example the semicircular plate 32 by which the three universal joints 36 are fixed to the rectangular frame 42 might be replaced by three separate brackets. The number of parallel legs 34, which provide for linear motion parallel to the two axes X and Y, might be four instead of three. The support block 46 might be slidable along the outside of one or more slide bars, instead of slidable within the frame 42, to provide for linear motion parallel to the Z axis. And the shapes of the yokes 48 and 50 and the orientations of the three rotary axes A, B and C might differ from those described.

The hand controller 10 of the invention provides a comparatively simple, compact displaceable control input device which is convenient for an operator to use, and which can incorporate force (and torque) feedback in respect of all six of its degrees of freedom. Use of the hand controller 10 requires use of only one hand. By way of example it might be used for controlling operation of an under-sea manipulator arm carrying out surface treatment of an offshore structure by grinding; yet again it might be used to control a manipulator arm performing assembly of a space station in space.

I claim:

1. A hand controller whereby an operator can control movements of a mechanism, the controller comprising a base, a support frame connected to the base by three parallel non-telescopic link arms with universal joints at each end so as to allow displacements of the frame relative to the base, and an operating handle connected by four serially arranged links to the support frame, the said links respectively allowing rotation of the handle about three independent axes and linear displacement of the handle relative to the support frame.

2. A hand controller as claimed in claim 1 incorporating means to provide force and torque feedback in relation to each degree of freedom of the handle.

* * * * *